United States Patent [19]

Walters et al.

[11] 4,413,648

[45] Nov. 8, 1983

[54] HYDRAULIC VALVES

[75] Inventors: Ronald B. Walters, Wembley; Anthony G. Hammond, Guildford, both of England

[73] Assignee: Sperry Limited, Cobham, England

[21] Appl. No.: 171,894

[22] Filed: Jul. 24, 1980

[30] Foreign Application Priority Data

Jul. 26, 1979 [GB] United Kingdom ................. 7926162

[51] Int. Cl.[3] ..................... F16K 31/122; F16K 31/02

[52] U.S. Cl. ................................ 137/486; 137/487.5; 251/30

[58] Field of Search ................ 251/30; 137/486, 487.5

[56] References Cited

U.S. PATENT DOCUMENTS

| | | | |
|---|---|---|---|
| 2,582,088 | 1/1952 | Walthers | 251/30 |
| 2,655,940 | 10/1953 | Jackson | 251/30 |
| 2,771,062 | 11/1956 | Hayner | 251/30 |
| 2,984,251 | 5/1961 | Quinby | 137/487.5 |
| 3,033,228 | 5/1962 | Mohler | 251/30 |
| 3,252,477 | 5/1966 | Chard | 137/486 |
| 3,732,887 | 5/1973 | Hayner | 137/486 |
| 4,014,509 | 3/1977 | Yoshino et al. | 251/30 |
| 4,201,116 | 5/1980 | Martin | 251/30 |
| 4,236,690 | 12/1980 | Smilges et al. | 251/30 |

FOREIGN PATENT DOCUMENTS

| | | | |
|---|---|---|---|
| 1335042 | 10/1973 | United Kingdom . | |
| 2065929 | 7/1981 | United Kingdom | 251/30 |

*Primary Examiner*—George L. Walton
*Attorney, Agent, or Firm*—Barnes, Kisselle, Raisch, Choate, Whittemore & Hulbert

[57] ABSTRACT

A pilot actuated hydraulic control valve has a flow setting member in the form of a valve piston an end of which co-operates with radial outlet ports of the valve to form a variable metering orifice. A flow sensor provides a feedback differential pressure proportional to the flow through the valve and that feedback differential is used to control a pilot stage which actuates the flow setting member.

4 Claims, 8 Drawing Figures

HYDRAULIC VALVES

This invention relates to valves, and in particular to hydraulic control valves.

A pilot actuated hydraulic control valve is known from U.K. Pat. No. 1335042, in which the lands and the intermediate recesses of a cylindrical valve spool housed slidably in a matching valve bore, co-operate with inlet and outlet ports radially entering the valve bore to provide several variable metering orifices whose apertures are dependent on the positions of the lands and recesses relative to the ports. The axial location of the spool, which determines these relative positions, is varied by applying different actuating pressures to the two ends of the spool. The pilot valve through which the actuating pressures are applied to the two spool ends, is of similar construction, with the axial location of its spool being determined by both a setting force applied to it by a force motor, and a feedback pressure differential derived at a flow sensor placed in a main flow path.

Because the effective surface areas of the facing surfaces of the two lands adjoining each recess are equal and the pressure acting on them are the same, the spool of the aforementioned control valve is nominally balanced with respect to the pressures in each of its main flow paths. Consequently, the actuating pressures which need to be applied to the spoolends are largely unaffected by the pressures in the main flow paths.

The aforementioned prior art valve performs satisfactorily over a wide range of applications but has an undesirably complicated structure for applications in which directional control of the fluid flow is not required.

The present invention provides a flow feedback responsive pilot-actuated hydraulic control valve in which fluid flow is metered by varying the aperture of a metering orifice through axial movement within a valve cavity, of a fluid pressure operated valve piston an end surface of which is subject to the pressure of the fluid at the inlet to the metering orifice.

Conveniently, one or more radial outlet ports from the cavity cooperate with said end of the piston to form the metering orifice, and the inlet in coaxial with the valve piston.

The pilot stage will usually comprise a spool valve operated by electromagnetic flow setting means such as a proportional solenoid acting on the pilot spool against a restoring force provided by a bias spring, and the pilot stage will respond to electrically or hydraulically transmitted feedback from a flow-sensing device having a variable orifice, a fixed orifice, or both.

In one form of the present invention, the hydraulic control valve has a main stage the valve piston of which is a stepped valve piston slidably housed in a matching stepped cavity, said end being the end of the valve piston which has the smaller effective end area, and a pilot stage which controls the proportion of the pressure at the inlet to the metering orifice which is applied to the larger effective end area of the stepped valve piston.

In an alternative form the main stage of the hydraulic control valve has a collared valve piston having equal effective areas at both ends and one or more end-to-end fluid ducts, the collar providing oppositely directed actuating surfaces of equal effective areas to which the actuating pressures, provided by pilot valve, are applied to meter the flow. The fluid duct or ducts ensure that both ends of the valve piston are exposed to the pressure at the inlet to the metering orifice.

The valve may be constructed as in-line flow control valve in which the metering orifice and the flow-sensing device are in series, or the valve may alternatively be constructed as by-pass valve, with the flow-sensing device and the metering orifice lying in parallel. In this second form the valve may be used to control the flow or the pressure applied to a load.

Since the valve piston can be made shorter than an equivalent spool, the present invention provides a unidirectional control valve of fairly compact and simple construction. Moreover, on account of a simple flow pattern its parasitic flow resistance, that is flow resistance other that that due to the metering and flow sensor orifices, will generally be less than that of a prior art spool valve of similar external dimensions.

The present invention shall now be described further by way of example only and with reference to the accompanying drawings of which:

Figure 1:
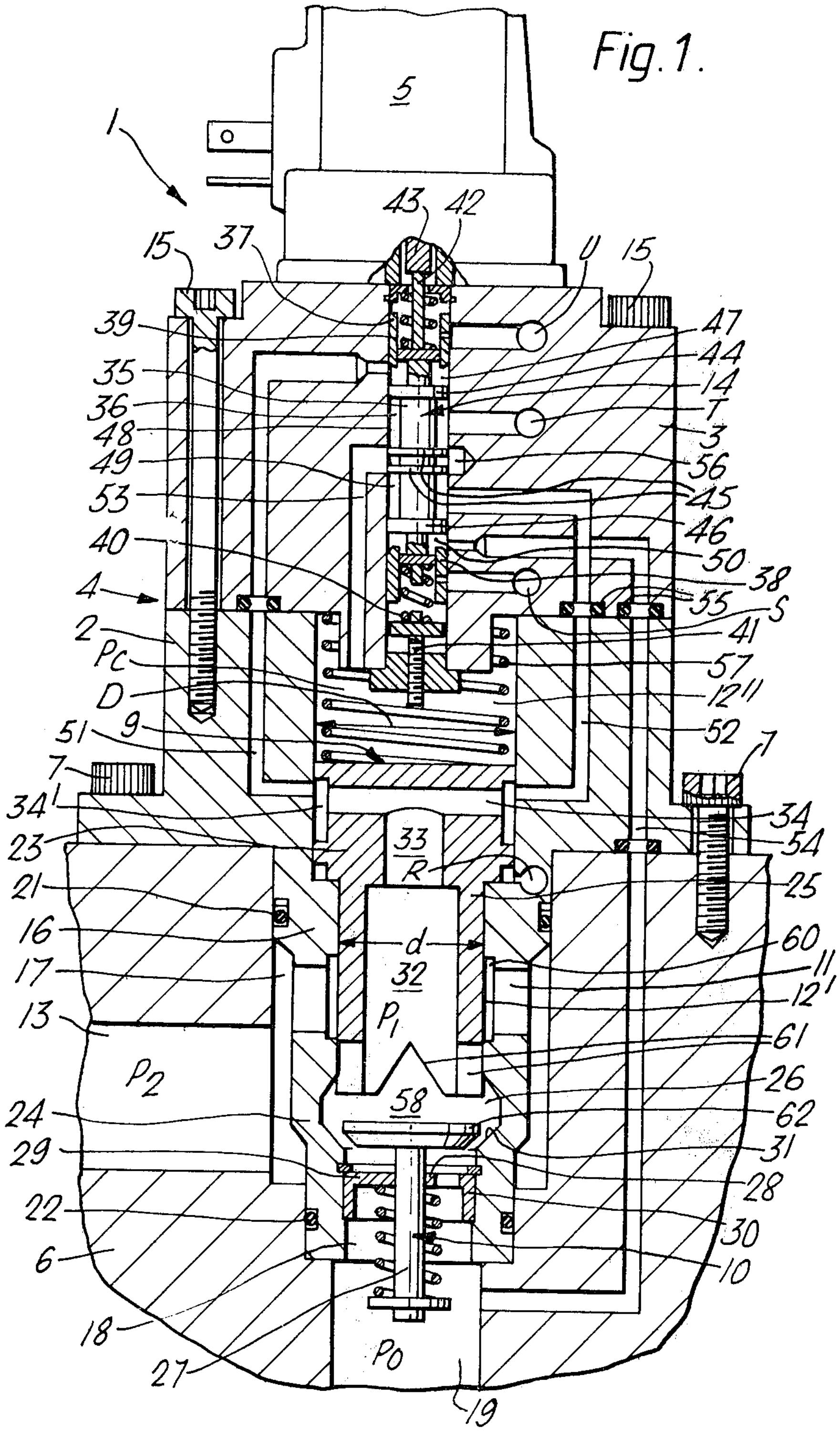
FIG. 1 is a schematic section of an in-line flow control valve according to the invention.

Referring first to FIG. 1, a cartridge-type in-line flow control valve 1 includes a main stage located within a main valve block 2, a pilot stage housed within a pilot valve block 3, and a proportional solenoid 5. The main valve block 2 and the pilot valve block 3, which is secured to the main valve block 2 by several bolts 15 of which two are shown, together constitute the valve body 4 which itself is mounted on a valve base 6 and fixed thereto by bolts such as shown at 7.

The main stage comprises a stepped valve piston 9 whose large diameter portion 23 (diameter D) and small diameter portion 25 (diameter d) make a sliding fit with the large diameter section 12'' and the small diameter section 12' respectively of the stepped cylindrical cavity 12 formed by a centrally located through-bore in the main valve block 2. A compression spring 57 is interposed between the large diameter endface of the piston 9 and the facing part of the pilot valve block 3. A tubular extension, tube 16 of the main valve block 2, and the flow-sensor housing 24 which is integral with the extension 16 accommodated within a bore 17 in the housing 6, has an axial valve inlet port 18 leading to a valve chamber 58, and four radial valve outlet ports 11. A sharp-edged variable metering orifice is provided by the interaction of the annular groove 60 in the valve block 2 and the V-shaped recesses in the small diameter end 61 of the piston 9. The outlet ports 11 and the valve chamber 58 via the inlet port 18, communicate respectively with fluid passages 13 and 19 in housing 6. O-ring seals 21 and 22 provide for leak-tight contact with the wall of the bore 17.

The flow sensor housing 24 contains a flow sensor 10, comprising an axially moving bobbin 27 guided within a central hole 28 of a spoked support ring 29. The bobbin is spring-loaded, by means of a coil spring 30 such that its mushroom head 62 seats against the throat 31 in the absence of fluid flow. The optimum angle between the throat 31 and the bevelled surface of the mushroom head is approximately 35°.

The pilot stage assembly, which is housed in the pilot valve block 3, consists of a pilot spool 35 enclosed in a pilot valve bore 36. The pilot spool is guided axially within sealing bushes 37 and 38 at its outer ends, with biasing springs 39 and 40 being provided to return the spool 35 to its nominal null-position, as well as to overcome sticking due to friction, and provide sufficient stiffness for good dynamic performance. The null position of the pilot spool 35 is set by adjustment of the bias of spring 40 through rotation of the threaded stud of the null adjuster 41 thereby to lower or raise the attached platform on which spring 40 rests. A connecting rod 42 connects the pilot spool to the armature 43 of the solenoid 5. The pilot spool 35 carries end lands 44 and 46 separating end chambers 47 and 50 of the pilot cylinder 36 from the pilot chambers 48 and 49 respectively. The chambers 48 and 49 are separated by a double land 45 located midway between end lands 44 and 46. The double land 45 is dimensioned so as to be in underlap with the radial, drilled port 56 when centred with respect to port 56.

The valve body 4 incorporates internal fluid ducts 51, 52, 53, 54, with O-ring seals 55 preventing leakage at the boundary of main valve block 2 and pilot valve block 3, and, in the case of fluid duct 54, also between main valve block 2 and housing 6. The valve body 4 also contains drainage ducts, designated R, S, T, and U in the drawing which are connected to a fluid tank at atmospheric pressure. In practice, not all these ducts would normally be in the same plane, but, in order to aid the understanding of the invention, are shown in the drawings as lying in the plane of the section. All the internal ducts are formed by drilling from the outside and subsequent plugging as shown at 887, FIG. 8. Drainage ducts S and U serve to drain off any hydraulic fluid seeping past sealing bushes 37 and 38, and drainage duct R prevents the build-up of pressure in the annular area behind the large diameter portion of the piston 9 and thus serves to decouple the fluid pressures at opposite ends of the piston. Drainage duct T is the drain for fluid supplied under pressure from valve chamber 58 via fluid passages 32, 33, radial passage 34 and circumferential groove 34' of the piston 9 and fluid duct 52 to pilot chamber 49. The pressure differential developed in operation of the valve across the flow sensor 10 is transmitted to end chambers 47 and 50 by way of ducts 51 and 54 respectively. Fluid pressure in the port 56 of the pilot valve is applied to the large diameter endface of the piston 9 through duct 53.

In operation of the valve 1, supply pressure $P_o$ is present at inlet port 18, the load such as a hydraulic actuator (not shown) being connected to the fluid passage 13. When the valve is in the closed position, as shown in FIG. 1, the piston 9 rests against the shoulder of the stepped bore 12 and the outlet ports 11 are blocked off by the small diameter portion 25 of the piston 9, the pressure $P_1$ within the valve chamber 58 being equal to the supply pressure $P_o$. When the double land 45 is centred with respect to the port 56, then, on account of equal pressure drops at the two lands of double land 45, the pressure $P_c$ applied to the large diameter endface of the piston 9 is equal to one half the pressure $P_1$. The diameters D and d are chosen such that their effective areas are in a ratio of 2:1 and therefore the net force on the piston 9 due to pressures $\frac{1}{2}P_1$ and $P_1$ is zero, and the piston 9 is stationary. A necessary bias for the piston 9 towards the closed position is obtained by adjusting the null position of the double land 45 of the pilot spool 35 to be off centre with respect to the port 56 such that the pressure $P_c$ is somewhat larger than half the pressure $P_1$, a further small bias being provided by the spring 57 acting on the valve piston 9. Furthermore, when the valve is closed, the feedback pressure differential across the pilot spool 35 between end-chambers 47 and 50 is zero.

In order for flow to commence, the proportional solenoid 5 is energised with a current proportional to the required flow. As a result the pilot spool 35 is moved downwards by some distance against the bias spring 40. The consequent decrease in the gap between the pilot chamber 49 and the port 56, coupled with an increase in the gap leading from the port 56 to the pilot chamber 48, which by virtue of its connection to the drainage duct T is at atmospheric pressure, leads to a reduction in the pressure $P_c$ in the port 56 and hence on the large endface of piston 9. The piston 9 therefore lifts off the shoulder in the stepped bore under the greater force now acting on the small endface, and fluid begins to flow through outlet ports 11 to the load.

As soon as fluid begins to flow in the main flow path leading from fluid passage 19 to the outlet ports 11, in sufficient quantity for the flow-sensor bobbin 27 to rise off the throat 31, a pressure differential is developed across the flow-sensor 10 which is applied in the above-described manner across the pilot spool 35, bringing the feedback arrangement into operation, that is to say, the pilot spool is now subject also to a hydraulically transmitted feedback force provided by the pressure differential between the ends of the spool 35. Depending on whether the flow is less or greater than the required flow, this force will be less or greater than that applied by the solenoid 5. Accordingly, the pressure $P_c$ acting on the large endface of piston 9 will be nominally less or greater than $\frac{1}{2}P_1$, after allowing for hydrodynamic forces acting on the piston, and the piston will move to increase or decrease flow through the valve. Since the pressure in end chamber 47 is lower than (or at most equal to) that in end-chamber 50, which is at supply pressure $P_o$, the force on pilot spool 35 due to the pressure differential always opposes that provided by the solenoid, the force being the greater the larger the flow through the flow-sensor 10. When the flow through the valve is at the desired rate, the forces on the pilot spool 35 balance such that the double land 45 is nominally centred with respect to the annular port 56, i.e. the pressure $P_c = \frac{1}{2}P_1$, and the piston is stationary.

Figure 2:
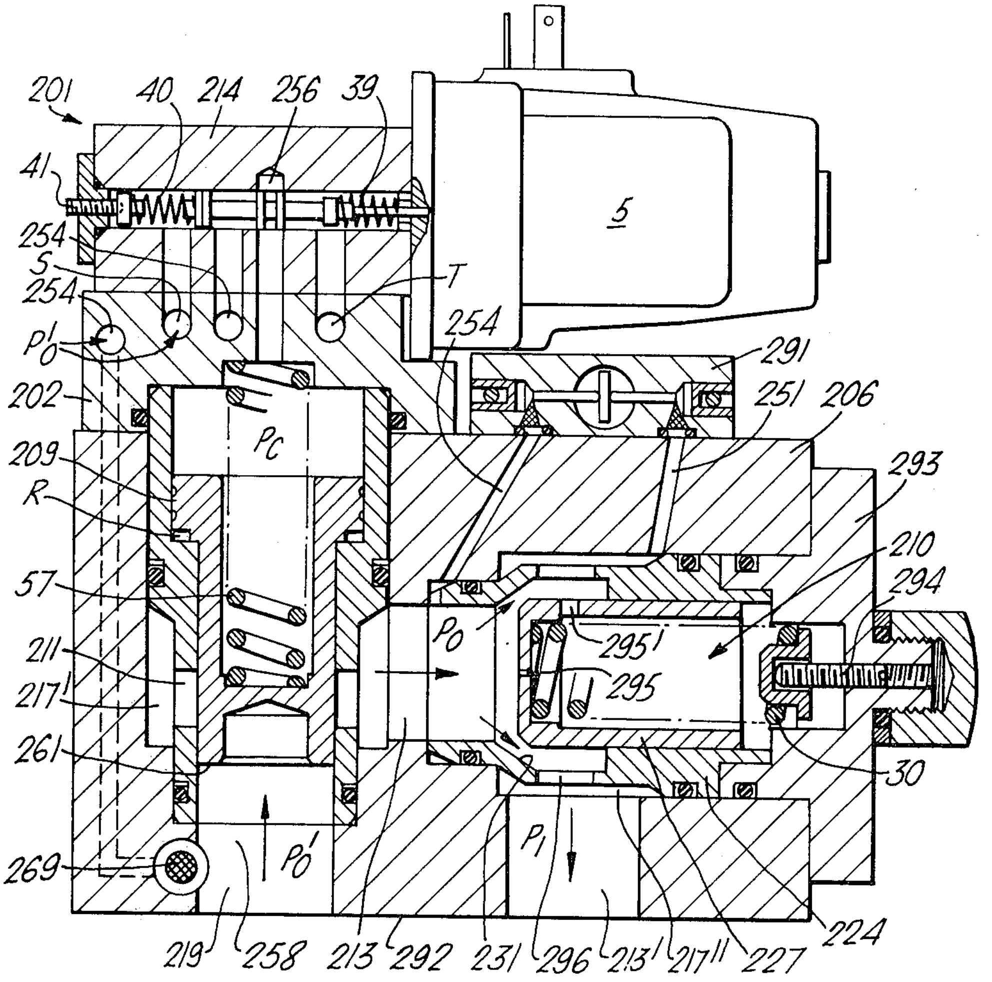
FIG. 2 is a schematic section of a modified form of the valve of FIG. 1.

Valve 201 of FIG. 2 is another embodiment of an in-line control valve of the present invention. The value 201 is essentially the same as valve 1 in respect of the combination and inter-action of the integers making up the valve, but shows various modifications in the detailed construction to which the following description will by-and-large be confined.

The main differences between the valve 1 and the valve 201 are the location of the flow sensor 210, itself a variant of the flow sensor 10, in the valve outlet rather than in the valve inlet, the use of a pressure transducer 291, which converts the feed-back pressure differential into an equivalent electric feed-back signal, and the adaption of the valve base 206 to accommodate the altered flow sensor location, and to permit gasket mounting of the valve 201. Further minor changes involve the simplification of the valve piston 209 and the pilot valve 214, which follows from the elimination of some of the internal fluid ducts made possible by the conversion of the feed-back pressure differential into an electric feed-back signal.

Considering some of the aforementioned differences in more detail, a modified valve base 206 has inlet and outlet passages 219 and 213' both of which terminate in the planar mounting inter-face 292 of the valve base 206. In use, the valve 201 is mounted in a conventional manner on a matching inter-face of some other hydraulic component (not shown) with a gasket being interposed between the adjacent faces. The inlet passage 219 leads into a co-axial stepped bore 217' into which is inserted the tubular casing 216 housing the valve piston 209. The tubular casing 216 roughly corresponds to the tube 16 of valve 1, and is provided with the radial outlet ports 211, which together with the lower end 261 of the valve piston 209, form the metering orifice. A slightly increased overlap between the end of the valve piston 209 and the radial outlet ports 211, reduces fluid leakage when the valve 201 is shut off. Fluid passage 213 connects the stepped bore 217' to the stepped bore 217" which contains the flow sensor 210. The valve casing 216 is clamped into position by a clamping block 202, which is secured to the valve base 206 and which also incorporates fluid ducts 254, 256 S and T.

As indicated above, the flow sensor 210 is a variant of the flow sensor 10. The flow sensor 210 is in the form of a cartridge inserted into the board 217", and comprises a tubular flow sensor housing 224 secured to an end plate 293 of the cartridge.

Guided within the housing is the straight-sided barrel-shaped poppet 227, taking the place of the bobbin 27, whose open end faces the end plate 293. The poppet 227 is spring loaded by the coil spring 30, whose pre-load is adjustable with the aid of a setting screw arrangement 294 situated in the end plate 293, and the variable orifice of the flow sensor 210 is, as before, an annular orifice bounded by the bevelled edge of the poppet 227 and the throat 231 in the flow sensor housing 224. A small diameter fixed orifice 295 is provided in the poppet 227 to provide a measurable feed-back pressure differential even at very low flow rates, thereby reducing the minimum flow which can be metered by the valve. Fluid entering the interior of the poppet 227 at these low flow rates is discharged through an opening 295 in the side wall of the poppet and hence to the outlet passage 213' through openings in the flow sensor housing 224. The point at which the flow sensing action changes over from the fixed orifice 295 to the annular orifice, i.e. the point at which the poppet 295 lifts off the throat 231, is determined by the preloading of the spring 30. At higher flow rates the contribution of the fixed orifice to the total feed-back pressure differential becomes negligibly small due to its very much higher flow resistance, while at the same time the opening 295' maintains the area of the poppet 227 at the secondary, i.e. the oulet pressure of the flow sensor.

Irrespective of whether the pressure differential is developed across the fixed or the variable flow sensor orifice, it is applied via fluid ducts 254 and 251 to the cantilever beam of a conventional cantilever beam pressure transducer assembly 291 mounted on the valve base 206. The pressure differential many, for instance, be applied to the beam by means of two diameter-matched pins. Alternatively the pressure differential may be applied to a single pin and directly to the beam. The drawing illustrates a two-pin version in which the cantilever beam, which is shown lead-on, bends under the action of the pressure applied to the outer ends of the two pins and converts the applied pressure differential into an equivalent electric feed-back signal to be used to control the solenoid 5. This could be done by comparing a demand signal with the feed-back signal and applying the resultant error signal to control the solenoid.

The pilot valve 214, which is positioned with its axis at right angles to the axis of the main valve piston 209, comprises a landed spool 235 supplied via a washed filtered 269 and fluid duct 254 with the valve inlet pressure $P_O'$ and controlling the proportion of the pressure which is applied as control pressure $P_C$ to the larger end face of the valve piston 209. Bias springs 39 and 40 and the zero adjustment mechanism 41 are provided as the earlier described valve 1. Employing an electric signal to control the solenoid 5 enables a simplification of the pilot valve spool 235 to a two-land spool, and thus contributes towards reducing friction in the pilot valve 214 compared to that in the pilot valve 14 of FIG. 1.

Figure 3:
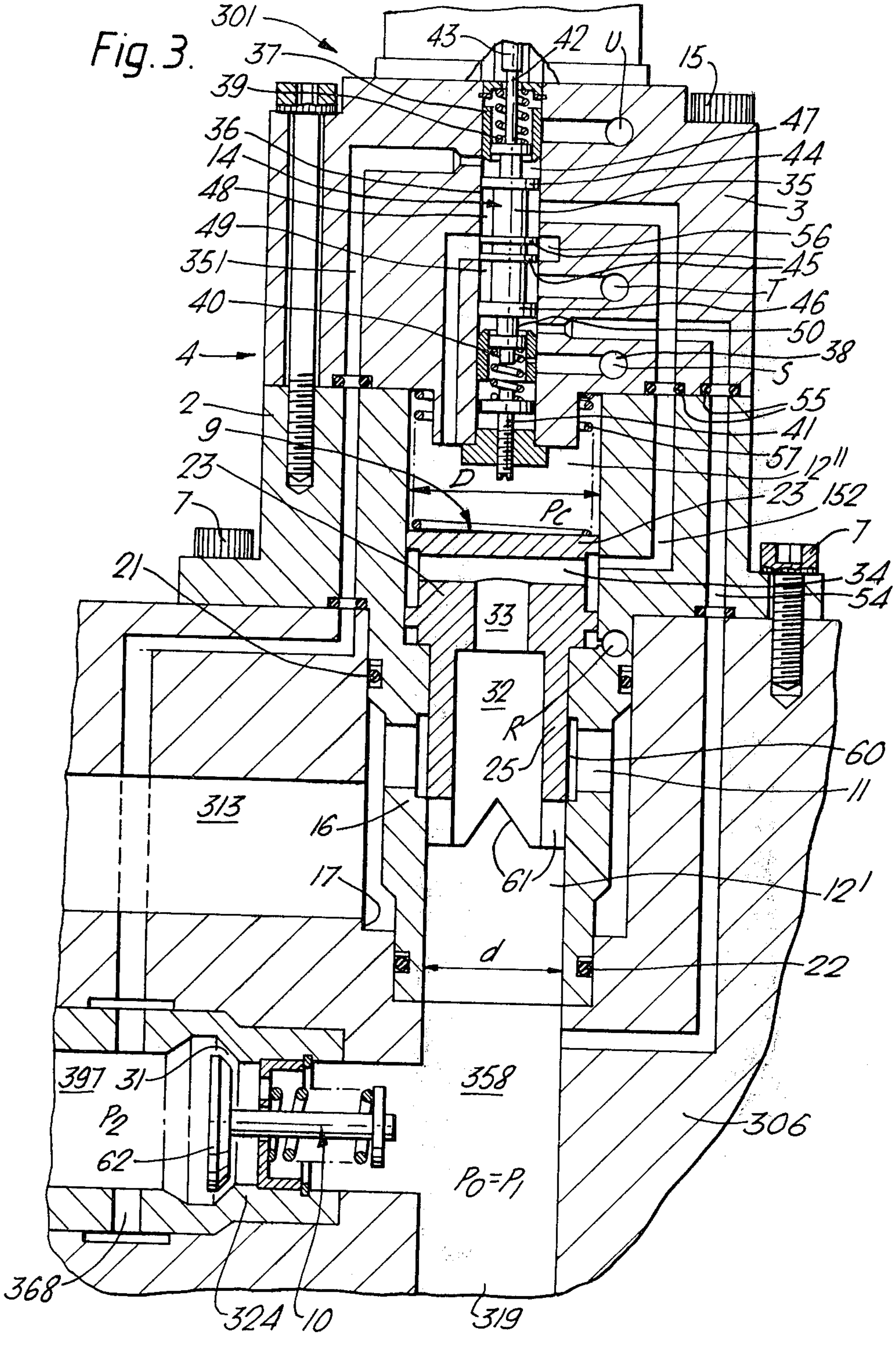
FIG. 3 is a schematic section of a by-pass valve according to the invention.

The by-pass valve shown in FIG. 3 is constructed in a manner similar to the valve of FIG. 1 and identical components are referenced by the same numeral, the major constructional difference between the two valves being the provision of two outlet passages in the housing 306, of which passage 397 leads to the load (not shown), and passage 313 forms a bypass line for the load and leads to a tank at atmospheric pressure. As in the previously described valve, the pressure differential across the flow-sensor which is now housed in the outlet passage 399, is transmitted to the end chambers 47 and 50 of the pilot valve cylinder 36. Fluid flow to the load is now controlled by regulating the amount of the flow discharged via the by-pass line, and as a consequence the direction of flow through the pilot stage, past the double land 45, must be reversed, that is, fluid passage 352 now connects the valve chamber 358 to pilot chamber 48, and pilot chamber 49 is connected to tank. It will be readily seen that, with the other forces on the pilot spool 35 being the same as before, the piston 9 will now open the valve when the fluid flow to the load is to be reduced, and close when it is to be increased.

Another major difference between the valves 1 (and 101) and 301 (and 401 and 501) is found in their operational characteristics if the pressures extant in their respective inlet passages, 19 and 319 and outlet passages to the load, 13 and 397, are compared. In both cases the outlet pressure $P_2$ depends, of course, on the load resistance, that is to say, the pressure $P_2$is low if the load resistance is low, and the pressure $P_2$ is high if the load resistance is high. However, while in valve 1 the supply pressure $P_o$ is substantially unaffected by variations in the load resistance since the flow-controlling metering orifice lies between the supply pressure inlet and the outlet passage to the load, the pressure $P_o$ in valve 301 is always equal to the pressure $P_2$, save for the comparatively small difference due to the pressure drop at the flow-sensor 10, because fluid flow to the load is controlled by regulating the rate of discharge to the tank through the outlet passage 313. This difference has important consequences in that it will in general be necessary to employ an accurately settable pressure relief valve (not shown) in the pressure supply line to valve 1, through which fluid is discharged almost continuously in order to prevent pressure build-up on its inlet side even under normal opening conditions; while for the by-pass valve 301 only the addition of a more simple over-pressure relief valve is required to provide a safety valve in case of malfunction. Also, the by-pass valve 301 will generally be more energy efficient, since fluid is discharged to the tank at a pressure commensurate with the load resistance, rather than at full supply pressure as in the case of the valve 1 where the pump (not shown) which supplies the hydraulic fluid to the valve has to operate at full load even when the flow demand is zero and all the fluid passes through the separate pressure relief valve. Notwithstanding the generally greater energy efficiency of the by-pass valve 301, the valve 1 will, for instance, be used where fluid flow to a load with fairly constant load resistance is to be controlled, or where simultaneous control is required of two or more individually controlled load circuits supplied from a common pressure supply.

A pressure responsive over-ride may be used with the by-pass valve 301, which may be either of electrical or mechanical (including hydraulic) nature, acting respectively via the current supply to the solenoid 5 or directly on the pilot stage 14. With the aid of such an over-ride and under conditions of very low or zero fluid flow to the load, that is when the pressure differential across the flow sensor 10 is nearly zero so that practically no feedback pressure is acting on the pilot spool 35, the by-pass valve 301 may operate to control the pressure applied to the load.

Figure 4:
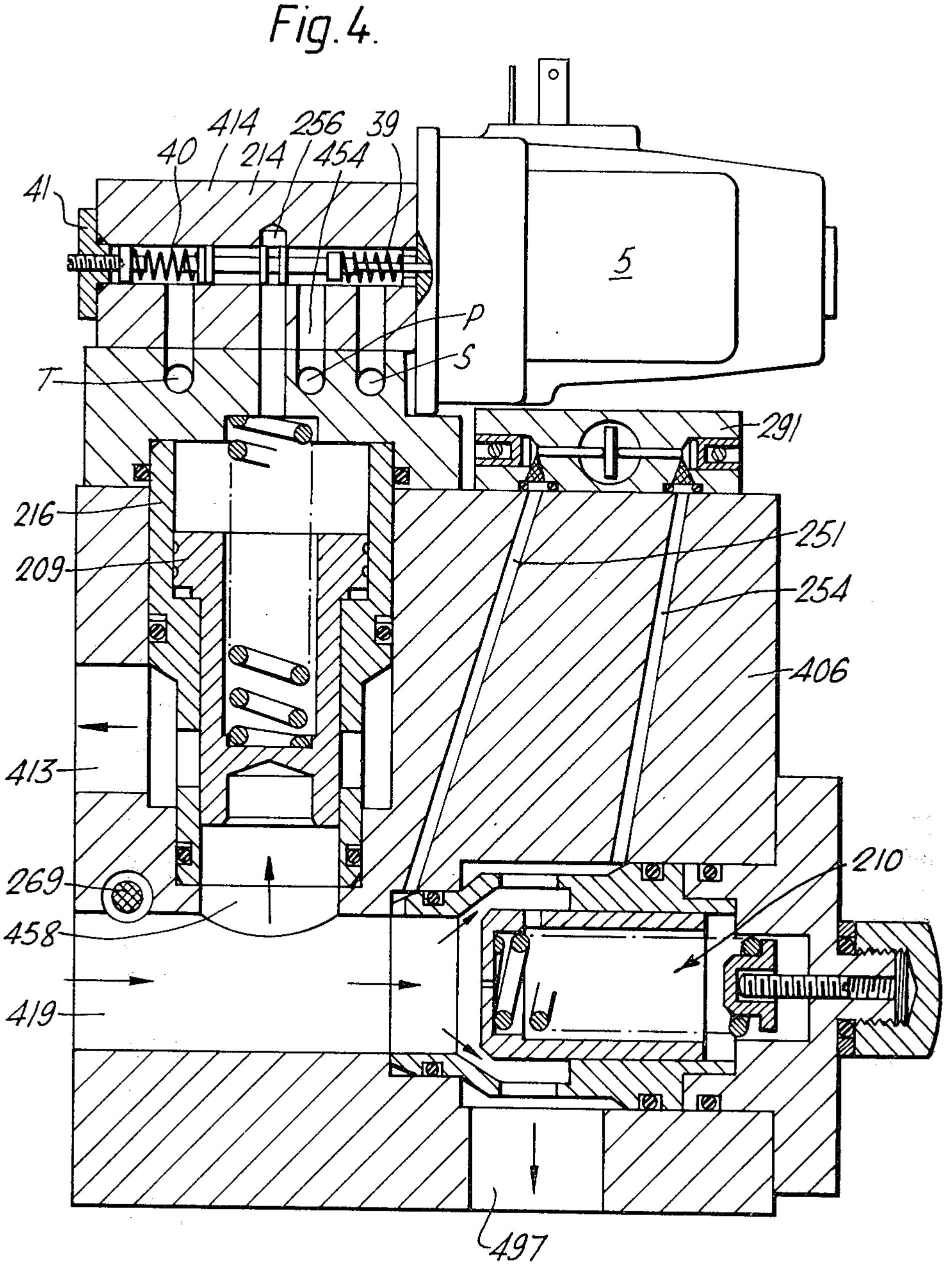
FIG. 4 is a schematic section of a modified form of the valve of FIG. 3.

FIG. 4 shows a by-pass valve 401 incorporating substantially the same modifications with respect to the valve 301, FIG. 3, as the valve 201 of FIG. 2, with respect to valve 1 of FIG. 1, save that the inlet and bypass outlet passages 419 and 413, and the metered outlet flow passage 497 respectively terminate in two planar mounting faces at right angles to each other. Also, the pilot spool 435 and the pressure supply duct 454 to the pilot valve are reversed as compared to the spool 235 and pressure supply duct 254 of FIG. 2, in order to obtain a pilot-valve fail safe operation, which causes the by-pass to be fully opened in the failure mode.

Figure 5:
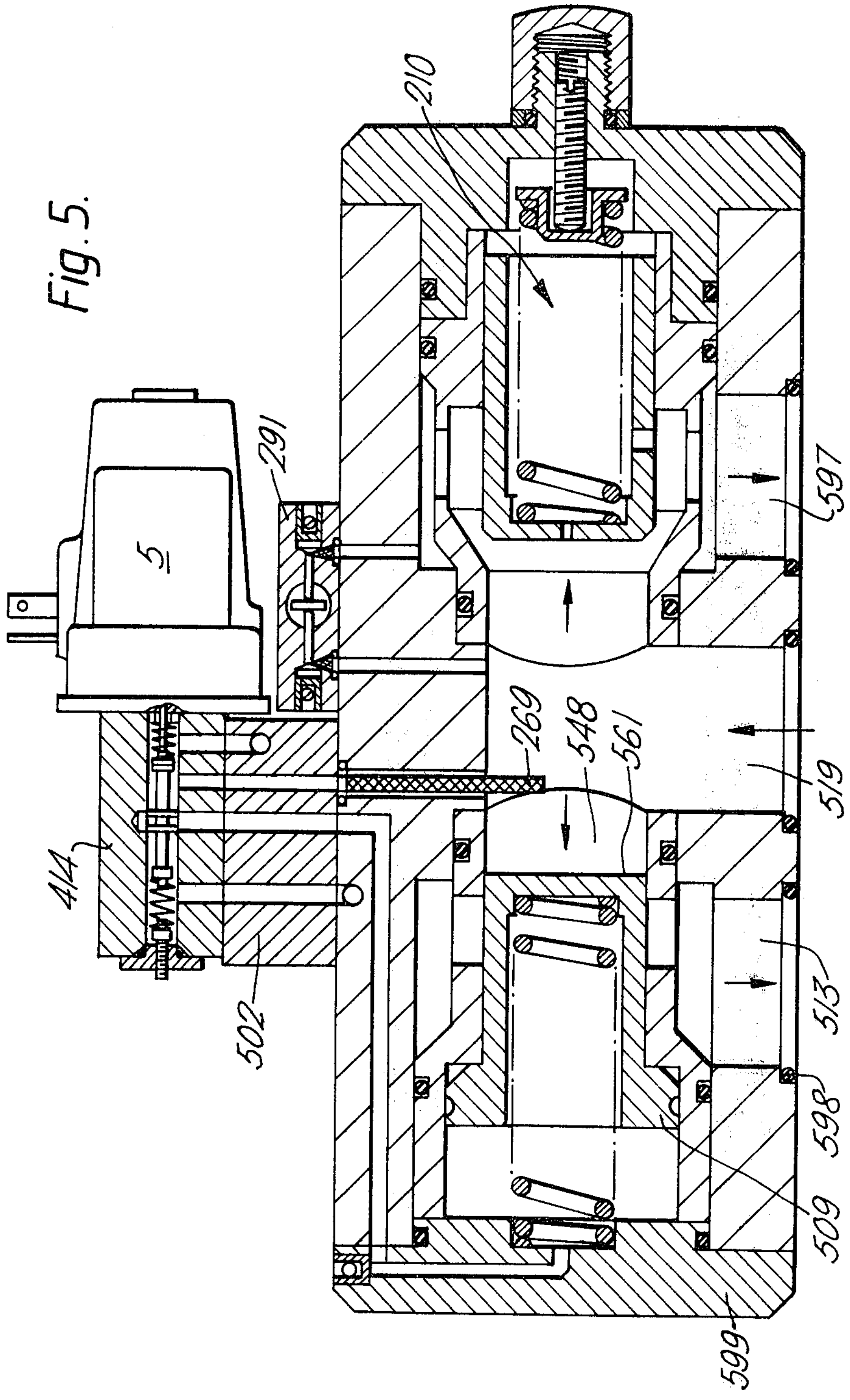
FIG. 5 is a schematic section of another modified form of the valve of FIG. 3.

FIG. 5 illustrates an alternative design of the valve 401, of FIG. 4, in which the valve and the flow sensor are symmetrically disposed about the valve inlet passage 519. This allows the provision of a single mounting interface for gasket mounting or has shown in FIG. 5, face mounting using O-ring face seals such as at 598. The only other noteworthy change lies in the necessity to provide a separate end plate 599 to clamp the tubular casing 216 of the main valve into position.

Figure 6:
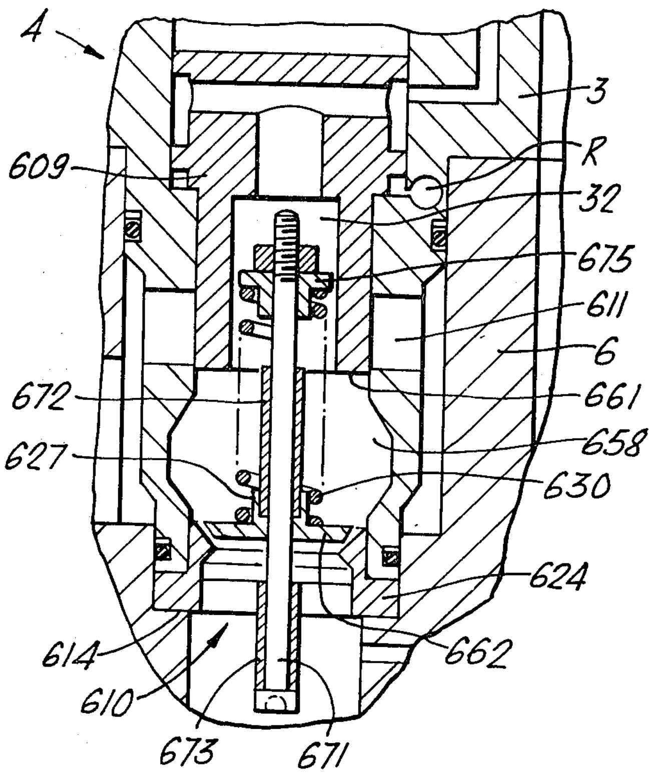
FIG. 6 shows details of modifications to the valves shown in FIGS. 1 and 3.

FIG. 6 illustrates some possible modifications of the throttling piston 9 of valves 1 and 301, the outlet ports 11 thereof and the flow sensor 10. Instead of the sharp-edged variable orifice being provided between the sides (and apex) of the inverted V's 61 of the piston 9, and the annular groove 60 as is shown in FIGS. 1 and 3, the circular outlet ports 611 now terminate flush with the inside wall of the main valve block, and the piston 609 has a flat end face, whose outer edge together with the circular inside edge of the outlet ports 611 form the variable metering orifice.

The modified flow sensor 610 has its spring assembly positioned downstream of the flow sensor bobbin head 662. The modified flow sensor 610 comprises a central shaft 671 on which the bobbin 627, which is joined to a sleeve 672, is slidably mounted, the shaft being supported by a tube 673 which extends outwardly from a support member 629. The support member 629 is clamped in between the shoulder 674 of the housing and the lower endface of the tubular portion of the main valve block 3. A spring 630 surrounding the shaft 671 is placed in between the bobbin head and a retaining ring 674 secured to that portion of the shaft 671 which extends into the passage 32 of the piston 609. The advantages of this arrangement are reduced obstruction of the main flow path as well as greater protection of the flow-sensor against damage during e.g. storage of the valve body 4 separate from the housing 6 (306).

Figure 7:
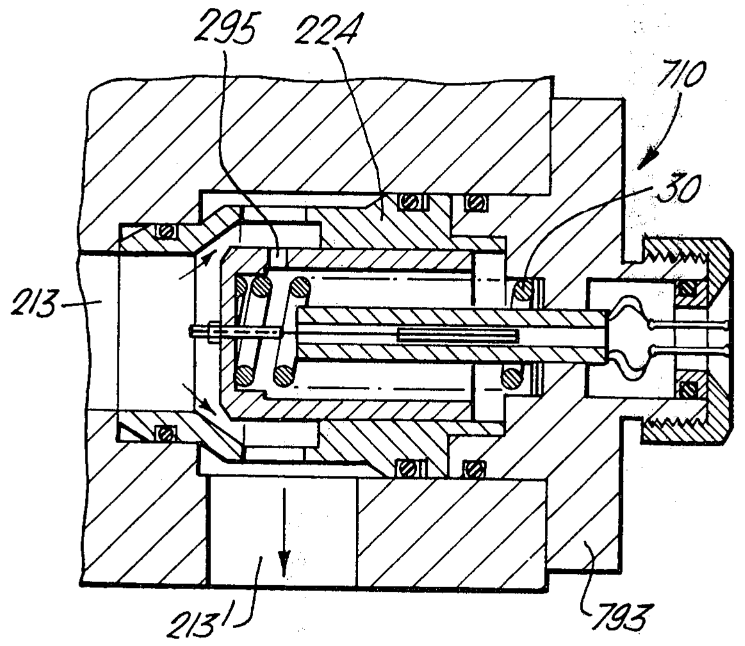
FIG. 7 shows details of further modifications of the valves of FIGS. 2, 4 and 5.

FIG. 7 illustrates another way of converting into an electric feed-back signal the feed-back pressure differential developed across the flow sensor 710, which is otherwise similar in construction to the flow sensor 201 of FIG. 2. In the flow sensor 710 the linear displacement, from its initial position, of the flow sensor bobbin 727 is measured by means of a linear variable displacement transducer, such as Sangama type NA2. The amount of linear displacement is determined by the balance of the pressure differential developed across the flow sensor and the opposing returning force of the spring 30, and thus provides a measure of flow through the flow sensor. An electrical null-adjuster 740, which has to be set prior to insertion of the flow sensor cartridge into the valve base, is provided in the flat end face of the flow sensor poppet 727. Adjustment of the spring pre-loading is accomplished by selecting a suitable number of washers 791, interposed between the end of the spring and the end plate 793. The opening 295 in the side wall of the poppet 727 transmits the flow sensor outlet pressure to the interior of the poppet. Using a linear displacement transducer eliminates the need for a pressure transducer, such as 291 of FIG. 2, and the associated fluid ducts, but does not give the same low flow range response as the alternative conastruction, since the signal is a function only of poppet displacement.

Figure 8:
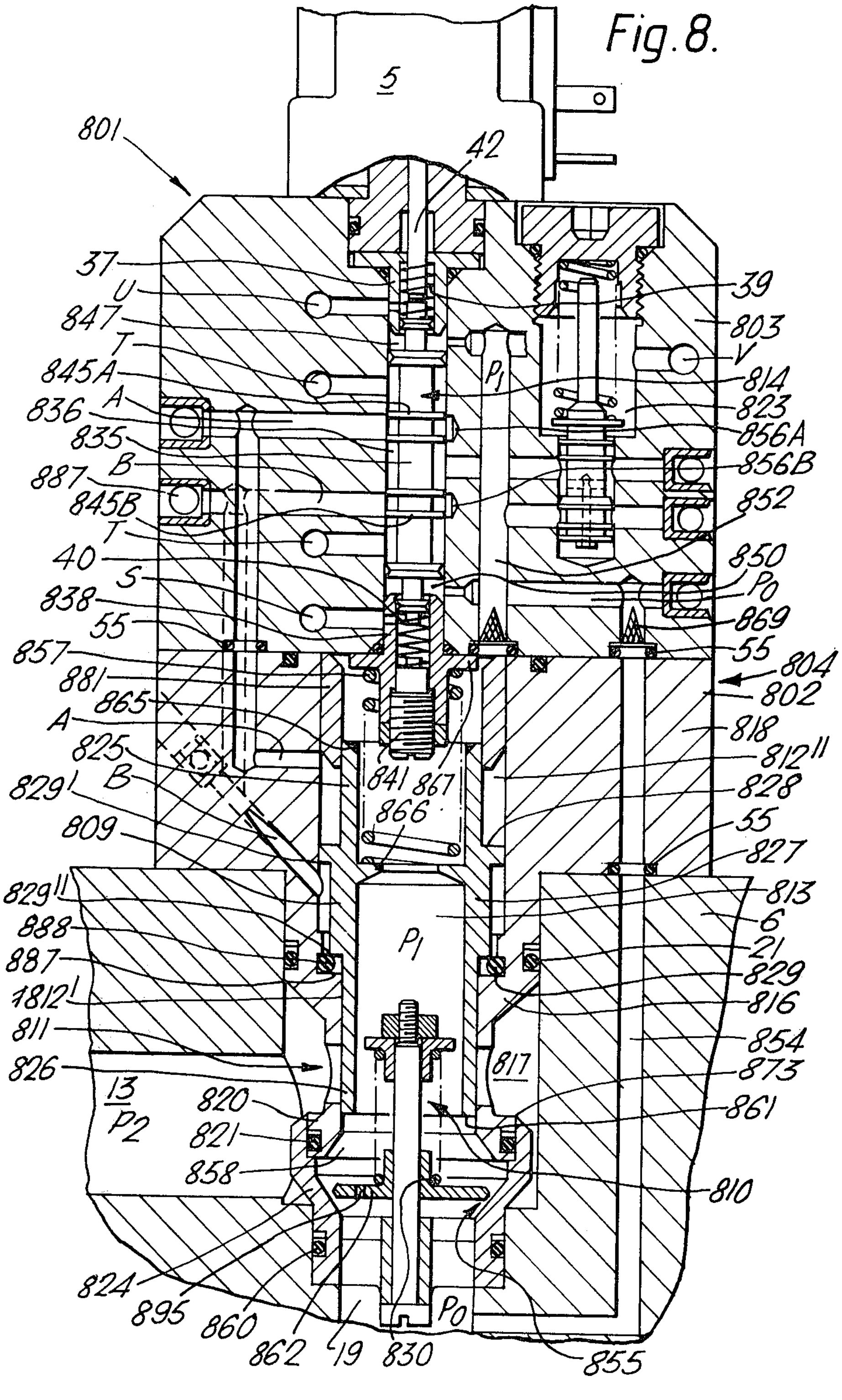
FIG. 8 is a schematic section of an alternative form of a flow control valve according to the invention.

Referring now to FIG. 8, there is shown an alternative form of the invention. A cartridge valve 801 designed to be fitted to a valve base 6, comprises a control or main valve and a pilot valve. The main valve which regulates fluid flow from an inlet passage 19 to an outlet passage 13 in the valve base 6, is controlled by the pilot valve, and the pilot valve by a proportional solenoid 5 mounted on the valve body 804.

The valve body 804 comprises a main valve housing 802 and a pilot valve housing 803. The main valve housing 802 has a valve bore 812 (i.e. 812' and 812") which extends form a block line portion, block 818, resting atop the valve base 2, into and through a tubular extension, tube 816, of the block 818, which (tube 816) is accommodated in the bore 810 of the valve base, to terminate in the inlet port 836 of the main valve 803. The valve bore 812 is a stepped bore with its smaller diameter section 812' lying wholly within the tube 816 and terminating in the inlet port. The bore 812 widens into the larger diameter section 812" near the upper end of the tube 812 and extends through the remainder of the housing 802. Four radial outlet ports 811 are provided in the wall of the tube 816 near the inlet port 858.

The valve piston is in the form of a hollow cylindrical, collared flow control member or sleeve 809 housed within the valve bore 812, its hollow interior constituting a single pressure equalising duct 813. Its lower end 826 makes a close sliding fit with the narrower section 812' of the valve bore, the annular lower end face 861 providing a metering edge which co-operates with the outlet ports 811 to form the variable metering orifice. The upper end 825 of the sleeve 809 is of the same diameter as the lower end 826 so that the sleeve 809 is pressure balanced with respect to the inlet pressure $P_1$, and makes a close sliding fit with a bush 881 retained at the upper end of the valve bore 812. The central portion of the sleeve 809 is shaped into a shouldered collar 827 providing the upper and lower actuating surfaces 828 and 829'. The lower actuating surface 829 area is made up of the radial transition surface 829' between the widest part, which makes a close sliding fit with the bore 812, and a region of intermediate diameter of the collar 827 spaced from the wall of the valve bore 812"; and a further radial transition surface 829" between the intermediate diameter region, and the lower end portion 826 of the sleeve 809 to which the further surface 829" also acts as lower end stop. A snap ring 888 resting in a circumferential groove adjoining the shoulder 887 of the bore 812 between its narrower and wider sections 812' and 812", results in a minimal area reduction on account of the line contact made when the collar 827 abuts it, and so helps to prevent "sticking" of the sleeve 809 in that position. "Sticking" in the uppermost position of the sleeve 809 is prevented by the provision of an oil relief slot 865 allowing oil to reach the upper endface of the sleeve 809.

A flow sensor 810 similar in construction to the flow sensor 610 of FIG. 6, is attached to the outwardly flared rim 820 surrounding the inlet port of the valve, being interposed between the inlet port 858 and the inlet passage 19 in the valve base 6. Staking over of the upper edge 873 of the flow sensor housing 864 at several points secures the flow sensor 810 to the valve. O-ring seals 21, 860 and 821 prevent leakage past the flow sensor housing 864, between the contacting surfaces of the flow sensor housing 864 and the rim 820, and from the bore 817 to the outside. A fixed orifice 895 is provided in the flowsensor head 862 for the purpose discussed in connection with the valve 201.

Bolts co-operating with peripheral flanges (not shown) on the outside of the block 818 and threaded bores (not shown) in the valve base 2 may be used in the manner shown in FIG. 1 to secure the valve housing 804 to the valve base 2. The pilot valve block 803 may be similarly secured to the block 818 by means of bolts (not shown). Leakage from internal fluid passages continuing across the boundaries between the base 2 and the block 818, and the block 818 and the pilot valve housing 803 is prevented by the provision of O-ring face seals of the kind shown for instance at 55. Strainers such as shown at 869 may be used to filter the fluid supplied to the pilot stage 814.

The pilot valve 814 has a valve spool 848 with two double lands 845A and 845B which control the relative proportions of the actuating pressures in the passages A and B, supplied from the main valve bore 812 at the pressure $P_1$ via an internal fluid 852 passage to a conventional pressure reducing valve 823 and hence at the reduced pressure $P_R$ to the pilot valve 814.

The pressure reducing valve 823 is retained in a partially threaded bore. As will become clear from the description below of the operation of the cartridge valve, the precise value of the pressure $P_R$ supplied by the pressure reducing valve 823 is not critical to the correct functioning of the valve, since only the pressure differential in the fluid ducts A and B derived by means of the pilot valve 814 is of importance.

The pilot valve spool 848 is slidably retained at each end in a sealing bush (37, 838) inserted into the pilot valve bore 836. The lower sealing bush 838 incorporates a zero-adjustment screw mechanism 841 for the pilot valve and, when the valve body 804 is assembled, protrudes into the main valve bore 812, its flanged rim 867 serving also as one abutment surface of a weak main valve spring 57 whose other end lies on an internal flange 866 of the sleeve 809 and slightly biases the same towards the "closed" position.

The pilot spool 848 is centered by means of a pair of springs 39, 40 at its outer ends, the lower one of which (40) provides a force adjustable by the aforementioned zero setting screw mechanism 841. An internal pressure duct 854 extending from the inlet passage 19 through the valve base 2, the block 818 and into the pilot valve block 803 transmits the supply pressure $P_o$ to the lower end chamber 850 of the pilot valve 814, and the pressure duct 852, a branch of which leads to the reducing valve 823, conveys the valve inlet pressure $P_1$ to the upper end chamber 847 of the pilot valve 814. Furthermore, a push rod 42 connects the pilot valve spool 835 to the armature (not shown) of the proportional solenoid 5.

In operation, assuming for the purposes of the present explanation that the main valve is initially closed, hydraulic fluid is supplied to the valve through the inlet passage 19 and via a small by-pass hole 895 in the flow sensor 810. As long as there is no fluid flow, the pressures $P_0$ and $P_1$ transmitted to the lower and upper end chamber 850, 847 respectively, of the pilot valve 814 are equal. Under these conditions, the pilot valve spool 835 is in its neutral position in which the double lands 845A and 845B of the pilot valve 814 are centred within the outlet ports 856A and 856B to fluid ducts A and B. Each fluid duct, A and B, transmits half the actuating pressure $P_R$, supplied by the pressure reducing valve 823, to the respective actuating surface 828 and 829, the fluid being drained at tank pressure through the upper and lower draining duct T respectively. In order to open the main valve, the solenoid 5 is energised, causing the push rod 42 to move the pilot valve spool 835 in a downward direction. As a result, the actuating pressure in duct A is reduced as the pressure drops across each half of the double land 845A are no longer equal; and similarly, the pressure in passage B is increased. The pressure differential thus applied to the sleeve 809 causes it to move upwards, and with the lower end face 826 of the sleeve 809 being withdrawn across the outlet ports 811, fluid starts to flow through the main valve.

As soon as fluid begins to flow a pressure differential between $P_0$ and $P_1$ is developed across the flow sensor 810; to begin with across the by-pass hole 895 in the flow sensor bobbin 862 and, once the bobbin 862 is displaced against the spring 830, across the annular orifice 855 formed between the bobbin 862 and the inner wall of the flow sensor housing 864. This pressure differential is fed back to the pilot valve spool 835 via the internal pressure ducts 854 and 852 and counter-acts the solenoid force, thus acting to return the pilot valve 835 to its neutral position. When the flow reaches the selected value, the pilot valve spool 835 reaches the neutral position, and the feedback pressure differential nominally equals the solenoid force. Thus the pressures on the actuating surfaces 828 and 829 are once again nominally i.e. apart from hydro-dynamic pressures, equal and the sleeve 809 is locked into position.

If for any reason, such as for instance an increase in the load (not shown) connected to the outlet passage 13, the flow through the main valve changes, the pressure differential across the flow sensor 810 changes and the pilot valve spool 835 is moved to cause an upward or downward movement of the sleeve 809 such that the flow is restored to its selected value. Thus, if the flow decreases, the pressure differential decreases, and as it no longer counterbalances the solenoid force, the pilot valve spool 835 moves downwards initiating the previously explained sequence for lifting the sleeve 809 until flow is restored. If, on the other hand, the flow through the main valve increases beyond the selected value, the pressure differential increases, and the pilot valve spool 835 is moved upwardly from its neutral position. The actuating pressure in duct A will therefore increase and at the same time that in fluid duct B will decrease. The force imbalance on the actuating surfaces 828, 829 will thus result in a downward movement of the sleeve 809, causing a reduction in the flow.

The sequence following a change in the selected flow by varying the energising current to the solenoid 5 will be similar. If the valve is to be shut, i.e. the flow is selected to be zero, the neutral position of the pilot spool 19 will be reached only when $P_0=P_1$, i.e. when the sleeve 809 has returned to its lowermost position in which the fluid flow is interrupted.

The valve of FIG. 8 can again be readily adapted to act as by-pass control valve, for which the following changes in the lay-out will be required as previously described with reference to FIGS. 3 to 5:

(a) Fluid flow to the load is made to by-pass the valve by providing a further outlet passage (not shown) branching off the present inlet passage 19.

(b) The flow sensor 810 has to be relocated into the further outlet passage, and (c) The feedback operation of the pilot valve 814 has to be reversed. This can be readily achieved, for example, either by an alteration of the fluid ducts 854 and 852 such that the pressure $P_0$ is applied to the upper, and $P_1$ to the lower end chamber, 847, 850, of the pilot valve 814, (reversing the direction of action of the feedback pressure differential), or by connecting the fluid duct A to the lower, and the fluid passage B to the upper actuating surface (828, 829) of the sleeve 809 (reversing the direction of the actuating pressures on the sleeve 809).

In both configurations, i.e. in-line and by-pass, of the valve of FIG. 8, the hydraulic feedback transmission may be replaced by electric feedback transmission such as described with reference to FIGS. 2, 4 and 5 above.

It should be noted that expressions such as "upwards", "downwards", etc. are used for convenience in the foregoing description in relation to valve components and movements, and refer to the orientation of these in the drawing only—in practice a valve may, of course, be mounted at any desired angle.

Figure 9:
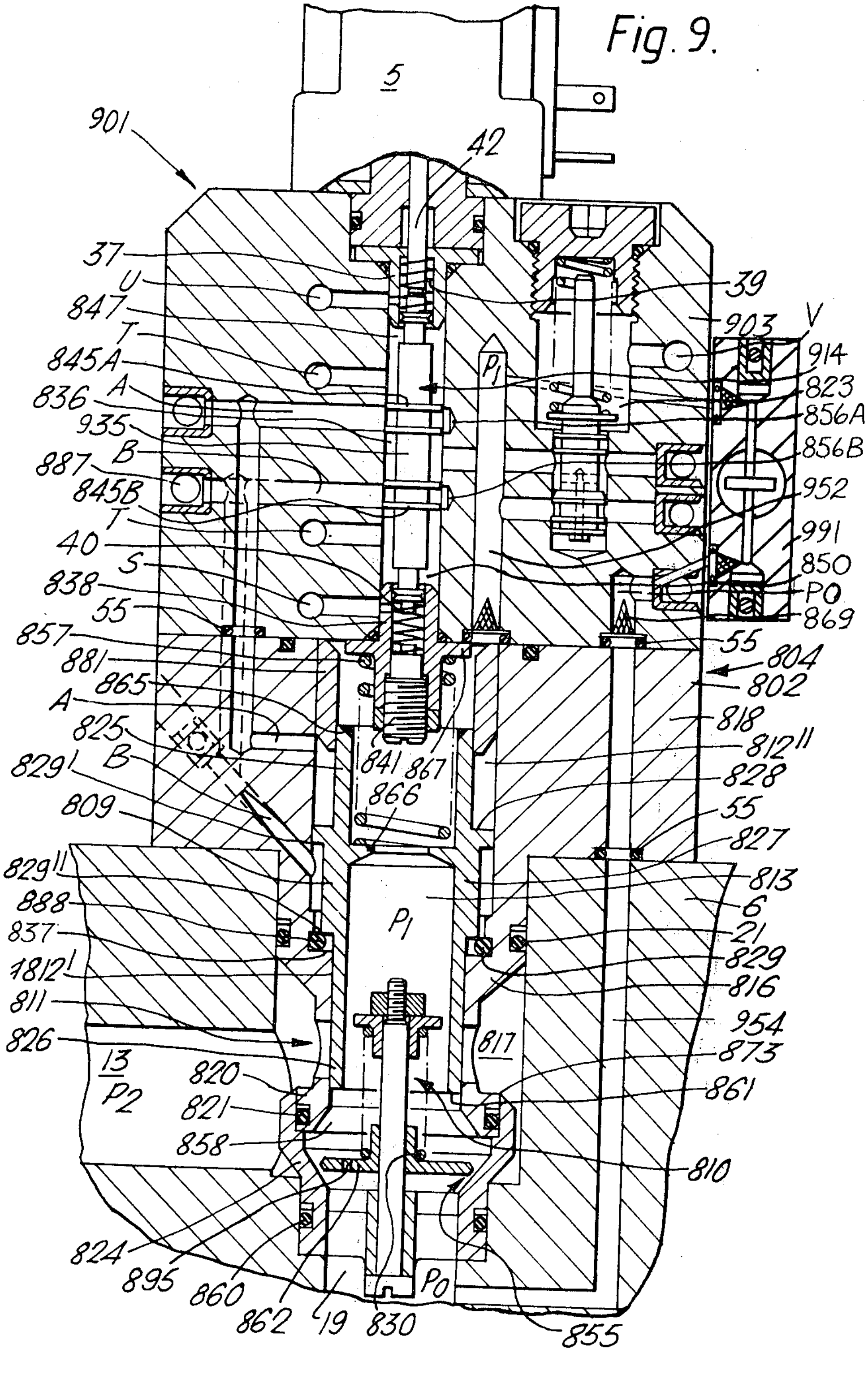
FIG. 9 is a schematic section of a flow control valve such as shown in FIG. 8 modified by a pressure transducer of the valve of FIG. 2.

Valve 901 of FIG. 9 is essentially the same as valve 801 in respect of the combination and interaction of the integers making up the valve, but shows some modifications in the detailed construction to which the following description will be confined.

The main difference between the valve 801 and the valve 901 is the use of a pressure transducer 991, which converts the feed-back pressure differential into an equivalent electric feedback signal. Further minor changes involve the simplification of the pilot valve 914 which follows from the elimination of some of the internal fluid ducts made possible by the conversion of the feed-back pressure differential into an electric signal.

The pressure differential developed across the flow sensor orifice is applied via fluid ducts 954 and 951 to the cantilever beam of a conventional cantilever beam pressure transducer assembly 991 mounted on the pilot valve housing 903. The pressure differential is applied to the beam by means of two diameter-matched pins. Alternatively, the pressure differential may be applied to a single pin and directly to the beam. The drawing illustrates the two-pin version in which the cantilever beam, which is shown head-on, bends under the action of the pressure applied to the outer ends of the two pins and converts the applied pressure differential into an equivalent electric feed-back signal to be used to control the solenoid 5. This could be done by comparing a demand signal with the feed-back signal and applying the resultant error signal to control the solenoid.

Employing an electric signal to control the solenoid 5 enables a simplification of the pilot valve spool 935 to a two-double-land spool, and thus contributes towards reducing friction in the pilot valve 914 compared to that in the pilot valve 814 of FIG. 8.

We claim:

1. A hydraulic control valve comprising
   - a main valve having a main valve inlet port and a main valve outlet port and incorporating a fluid pressure actuated valve piston located in a matching valve cavity and having first and second ends,
   - said valve piston cooperating with said main valve outlet port for forming a variable metering orifice to control flow from said inlet port to said outlet port,
   - said valve piston having at least one end-to-end fluid duct such that both ends of the valve piston are exposed to the pressure at the inlet to the metering orifice,
   - said valve piston ends having equal areas,
   - said valve piston comprising a collar defining a first effective control surface area and a second effective control surface area equal to the first effective control surface area,
   - a pilot stage including a pilot valve and variable flow setting means acting on said pilot valve,
   - fluid control means through which a controlled proportion of fluid pressure acting in operation of the valve on said second effective control surface area is applied to said first effective control surface area of the valve piston thereby to control the variable metering orifice,
   - flow sensing means between the inlet port and the outlet port for generating a flow-dependent feedback signal,
   - and feedback signal transmission means coupled to the flow sensing means and to the pilot stage to transmit the flow-dependent feedback signal to the pilot stage to control the variable flow setting means acting on said pilot valve.

2. A control valve according to claim 1 in which the flow setting means is a proportional solenoid.

3. A valve as claimed in claim 1 in which the pilot stage comprises a spool valve having a valve spool with two end lands and two intermediate lands, the intermediate lands cooperating with control ports in the pilot stage to control the actuating pressures applied to respective ones of said control surface areas, the feedback pressure differential developed across said flow sensing means being transmitted to respective ones of the end lands of said pilot stage to control said variable flow setting means.

4. A valve as claimed in claim 1 wherein said pilot stage includes an electromagnetic flow setting means, said main stage incorporating fluid ducts transmitting a pressure differential developed in operation across the flow sensing means to pressure transducer means, the pressure transducer means converting the feedback differential into an equivalent electric control signal to be applied to control the electromagnetic flow setting means.

* * * * *